(12) United States Patent
Miller et al.

(10) Patent No.: US 12,235,245 B2
(45) Date of Patent: Feb. 25, 2025

(54) TORQUE AND COMBINED LOAD FIXTURE AND TEST METHOD

(71) Applicant: Stress Engineering Services, Inc., Houston, TX (US)

(72) Inventors: Jack E. Miller, Houston, TX (US); Matthew Sanders, Cypress, TX (US)

(73) Assignee: Stress Engineering Services, Inc., Houston, TX (US)

( * ) Notice: Subject to any disclaimer, the term of this patent is extended or adjusted under 35 U.S.C. 154(b) by 504 days.

(21) Appl. No.: 17/431,140

(22) PCT Filed: Dec. 16, 2019

(86) PCT No.: PCT/US2019/066669
§ 371 (c)(1),
(2) Date: Aug. 13, 2021

(87) PCT Pub. No.: WO2020/167377
PCT Pub. Date: Aug. 20, 2020

(65) Prior Publication Data
US 2022/0136944 A1    May 5, 2022

Related U.S. Application Data

(60) Provisional application No. 62/805,577, filed on Feb. 14, 2019.

(51) Int. Cl.
*G01N 3/22* (2006.01)
*G01N 3/10* (2006.01)
*G01N 3/20* (2006.01)

(52) U.S. Cl.
CPC ............ *G01N 3/22* (2013.01); *G01N 3/10* (2013.01); *G01N 3/20* (2013.01); *G01N 2203/0019* (2013.01); *G01N 2203/0021* (2013.01); *G01N 2203/0023* (2013.01); *G01N 2203/0028* (2013.01); *G01N 2203/0048* (2013.01); *G01N 2203/04* (2013.01)

(58) Field of Classification Search
CPC .................. G01N 3/22; G01N 2203/0021
See application file for complete search history.

(56) References Cited

U.S. PATENT DOCUMENTS 6,181,040 B1    1/2001   Schob

FOREIGN PATENT DOCUMENTS

| CN | 103245571 A | 1/2015 |
|---|---|---|
| KR | 100994424 B1 | 11/2010 |
| KR | 101166522 B1 | 7/2012 |
| KR | 101264292 B1 | 5/2013 |

OTHER PUBLICATIONS

Korea Water, KR 101264292 B1, Specimen Image Readable Resonant Testing, May 2013, FIT Computer Translation (Year: 2013).*

(Continued)

*Primary Examiner* — Erika J. Villaluna
(74) *Attorney, Agent, or Firm* — Saunders McKeon PLLC; Christopher McKeon

(57) ABSTRACT

A method and apparatus for rotating a test specimen and simultaneously applying a torque, bending moment, and an axial load without the applied forces interfering with each other.

18 Claims, 9 Drawing Sheets

(56) References Cited

OTHER PUBLICATIONS

Ha et al., Specimen Image Readable Resonant Testing, FIT Machine Translation, May 2013 (Year: 2013).*
Jeong et al., Ring Shear Apparatus for Enforcing Sealing and Rotational Control, FIT Machine Translation, Jul. 2012 (Year: 2012).*
Notification of transmittal of the International Search Report and the Written Opinion of the International Searching Authority, or the Declaration, mailed May 14, 2020, PCT/US19/66669, 13 pages.

* cited by examiner

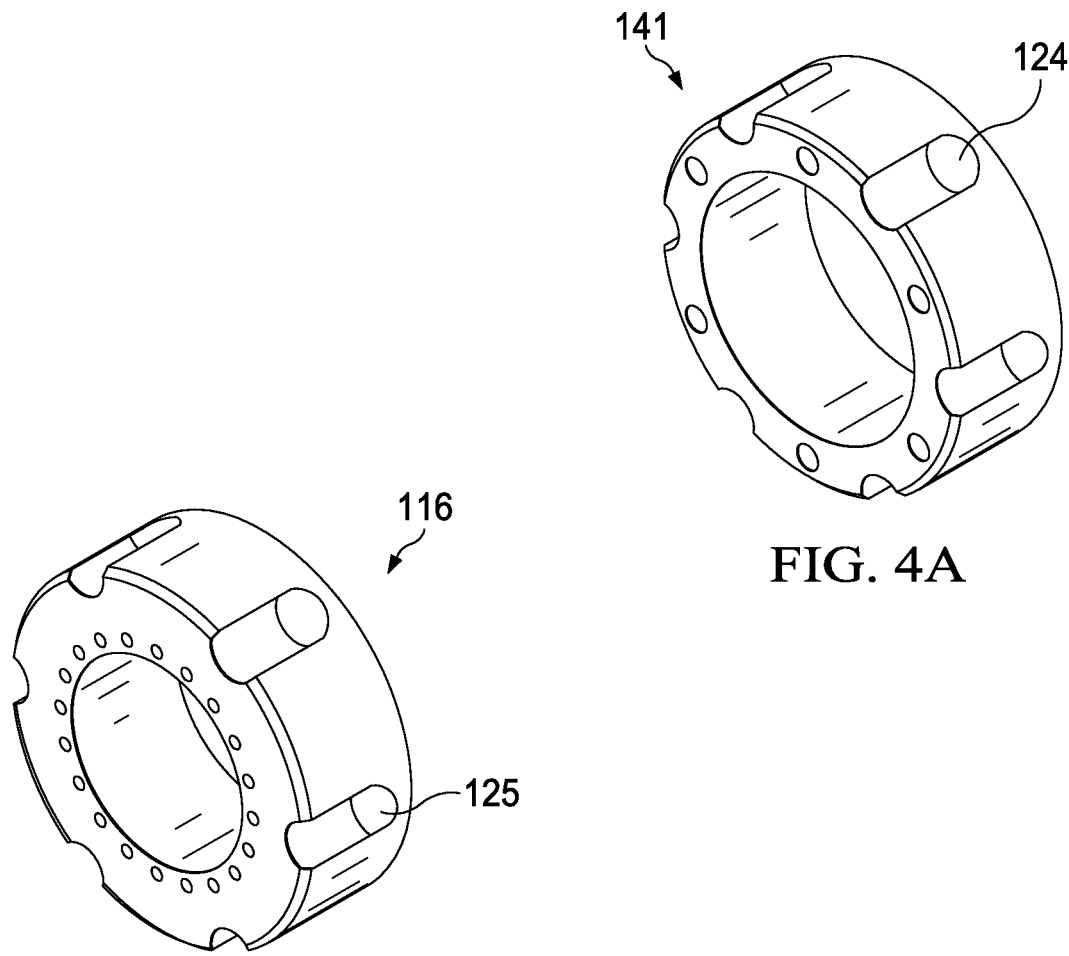
FIG. 4A
FIG. 4B
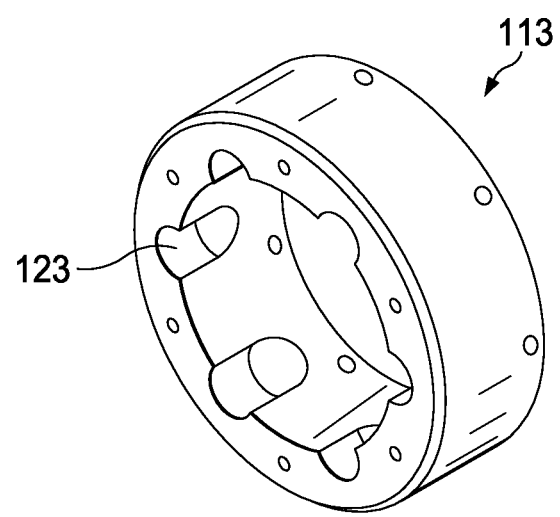
FIG. 4C

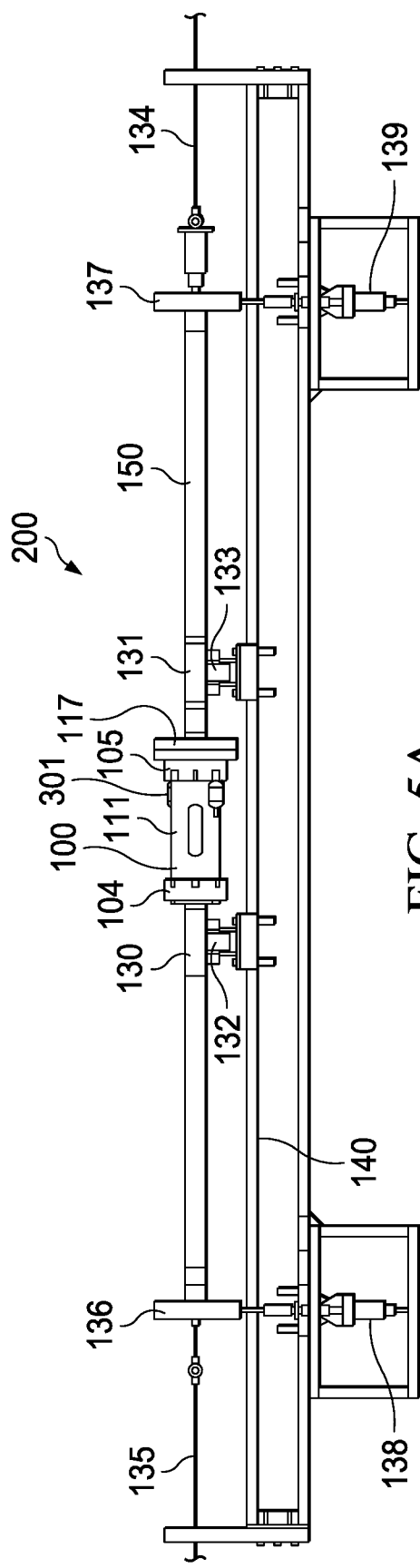
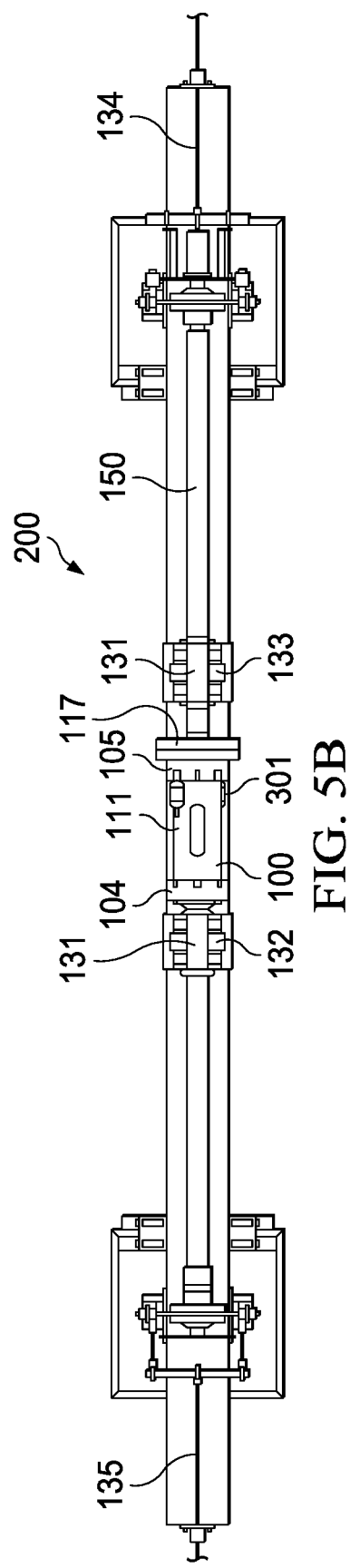
FIG. 5A
FIG. 5B

TORQUE AND COMBINED LOAD FIXTURE AND TEST METHOD

RELATED APPLICATIONS

This application is a US national phase of PCT/US19/66669 filed Dec. 16, 2019, which claims the benefit of U.S. Provisional Application No. 62/805,577, filed Feb. 14, 2019.

BACKGROUND OF THE INVENTION

Tubulars used in lateral or horizontal wells experience high loads in terms of magnitude and non-normal orientations. The tubular will contact the walls of borehole at multiple locations as torque, bending, and axial forces are transmitted through a drill string, pipe string, or tool string. The stresses seen, especially at the tools, or connections of the string can be significant and are difficult to simulate in testing.

An example of current testing methods for testing downhole tubulars and connections includes a sample test article, such as a tubular, bolted perpendicular to two beams to form a "H pattern" setup. Two hydraulic cylinders are connected to both beams and lined up parallel with the sample test article. The hydraulic cylinders can be pressurized the same amount to apply an axial load, or they can apply different forces to induce a bending load on the test article. Moreover, in this setup the test article is in part supporting the test structure because the hydraulic cylinders are typically connected to the beams via pins. This allows unwanted forces in the test article during testing. Another drawback to traditional test methods is that the fixturing does not allow for combined loads to be tested with torque without effecting the stiffness of the test article.

SUMMARY OF EXAMPLE EMBODIMENTS

This new test fixture allows for torque and other loads such as bending, axial load, and internal pressure to be applied without interfering with each other or the test article. An example embodiment may include an apparatus for testing a specimen having a tubular housing with a first end and a second end, a first end assembly, coupled to the first end of the tubular, further comprising a first cylindrical body having a plurality of recessed, axially oriented cylindrical half grooves located radially outward, a second cylindrical body having a plurality of evenly spaced, recessed, axially oriented cylindrical half grooves located radially inward, wherein the first cylindrical body is disposed within, and axially aligned with, the second cylindrical body with the grooves of both cylindrical bodies align with, and complement each other to form a first plurality of cylindrical cavities within the assembly, a sphere located within each of the first plurality of cylindrical cavities, forming a plurality of spheres, where the sphere can move during axial movement of the first cylindrical body relative to the second cylindrical body, and transmits a torque about the axis resulting from rotational movement of the first cylindrical body relative to the second cylindrical body, a second end assembly, coupled to the second end of the tubular, further comprising a third cylindrical body having a plurality of recessed, axially oriented cylindrical half grooves located radially outward, a fourth cylindrical body having a plurality of evenly spaced, recessed, axially oriented cylindrical half grooves located radially inward, wherein the third cylindrical body is disposed within, and axially aligned with, the fourth cylindrical body with the grooves of both cylindrical bodies align with, and complement each other to form a second plurality of cylindrical cavities within the assembly, a sphere located within each of the second plurality of cylindrical cavities, forming a plurality of spheres, where the sphere can move during axial movement of the first cylindrical body relative to the second cylindrical body, and transmits a torque about the axis resulting from rotational movement of the first cylindrical body relative to the second cylindrical body. The example embodiment can generate a torque in a test specimen, independent of and in conjunction with bending, axial forces, tensile, forces, normal forces, compressive forces, all while rotating if desired. This allows for testing tubulars, threaded connections used in the oilfield, and other test specimens where test data is sought concerning rotation while under a torque.

A variation of the example embodiment including a first plate axial aligned with and fixed to the second assembly. The example may include a second plate axially aligned with and rotatingly coupled to the second assembly, wherein the second plate can rotate independently of the first plate. The first plate may be star shaped. The second plate may be star shaped. The second plate may be coupled to a test specimen. It may include a means for applying a torque about the common axis between the first plate and the second plate. The means for applying a torque may be a plurality of hydraulic actuators, each with a first end coupled to the first plate and a second end coupled to the second plate. The means for applying a torque may include a plurality of bolts, each with a first end coupled to the first plate and a second end coupled to the second plate. The apparatus can apply a predetermined force to a test specimen. The predetermined force may be a compression force, a tension force, a bending moment, or a normal force. The apparatus can apply to a specimen a predetermined torque, a predetermined axial force, and a predetermined bending moment. The apparatus may rotate a specimen and apply a predetermined torque, a predetermined axial force, and a predetermined bending moment. The test specimen may be a tubular. The test specimen may be pressurized internally to a predetermined pressure.

An example embodiment may include a method for testing a specimen including coupling a first assembly to a first end of a test specimen, coupling a second assembly to a second end of a test specimen, applying a predetermined bending moment to the test specimen about an axis, rotating the test specimen at a predetermined number of revolutions per second about the axis while continuing to apply the predetermined bending moment to the test specimen. The example may include applying a first predetermined axial force to the test specimen. It may include applying a plurality of predetermined axial force to the test specimen. It may include applying a predetermined compressive force to the test specimen. It may include applying a predetermined tensile force to the test specimen. It may include applying a predetermined bending moment to the test specimen. It may include applying a predetermined bending moment, and a predetermined axial force to the specimen. The first assembly and the second assembly may be axially coupled via a cylindrical body with the specimen disposed therethrough. It may include applying the torque to the test specimen by rotating rotatable star shaped plate coupled to the test specimen about a common axis against a fixed star shaped plate coupled to the second assembly. The test specimen may be pressurized internally to a predetermined pressure.

An example embodiment may include an apparatus for testing a specimen having a tubular housing with a first end adapted to clamp/attach/weld/couple to a first end of a test specimen and a second end adapted to clamp/attach/weld/couple to a second end of a test specimen, a means for applying a torque differential between the first end of the test specimen and the second end of a test specimen, and a means for applying an axial force to the test specimen, wherein first end of the test specimen and the second end of the test specimen can elongate or contract while a torque is applied.

A variation of the example embodiment may include the means for applying a torque differential between the first end of the test specimen and the second end of a test specimen including a first plate axial aligned with and fixed to the second end of the tubular housing and a second plate axially aligned with and rotatingly coupled to the second end of the test specimen, the first plate and second plate coupled together with a plurality of actuators, wherein a torque differential is created by the plurality of actuators. The means for applying an axial force to the test specimen may include an assembly coupling the second end of the tubular housing to the second end of the test specimen having a plurality of evenly spaced, recessed, axially oriented cylindrical half grooves located radially inward, wherein the first cylindrical body is disposed within, and axially aligned with, the second cylindrical body with the grooves of both cylindrical bodies align with, and complement each other to form a first plurality of cylindrical cavities within the assembly. It may include a sphere located within each of the second plurality of cylindrical cavities, forming a plurality of spheres, where the sphere can move during axial movement of the first cylindrical body relative to the second cylindrical body, and transmits a torque about the axis resulting from rotational movement of the first cylindrical body relative to the second cylindrical body. It may include a means for applying a torque about the common axis between the first plate and the second plate. The means for applying a torque may be a plurality of hydraulic actuators, each with a first end coupled to the first plate and a second end coupled to the second plate. The means for applying a torque may include a plurality of bolts, each with a first end coupled to the first plate and a second end coupled to the second plate. The apparatus may apply a predetermined force being a combination of one or more of a compression force, a tension force, a bending moment, or a normal force. The apparatus may rotate a specimen and apply a predetermined torque, a predetermined axial force, and a predetermined bending moment.

BRIEF DESCRIPTION OF THE DRAWINGS

For a thorough understanding of the present invention, reference is made to the following detailed description of the preferred embodiments, taken in conjunction with the accompanying drawings in which reference numbers designate like or similar elements throughout the several figures of the drawing. Briefly:

FIG. 4A shows an example live keeper.
FIG. 4B shows an example dead keeper.
FIG. 4C shows an example cover.
FIG. 5A shows an example embodiment of the test assembly from the side with a tubular specimen.

FIG. 5B shows an example embodiment of the test assembly from the top with a tubular specimen.

DETAILED DESCRIPTION OF EXAMPLES OF THE INVENTION

In the following description, certain terms have been used for brevity, clarity, and examples. No unnecessary limitations are to be implied therefrom and such terms are used for descriptive purposes only and are intended to be broadly construed. The different apparatus, systems and method steps described herein may be used alone or in combination with other apparatus, systems and method steps. It is to be expected that various equivalents, alternatives, and modifications are possible within the scope of the appended claims.

Figure 1:
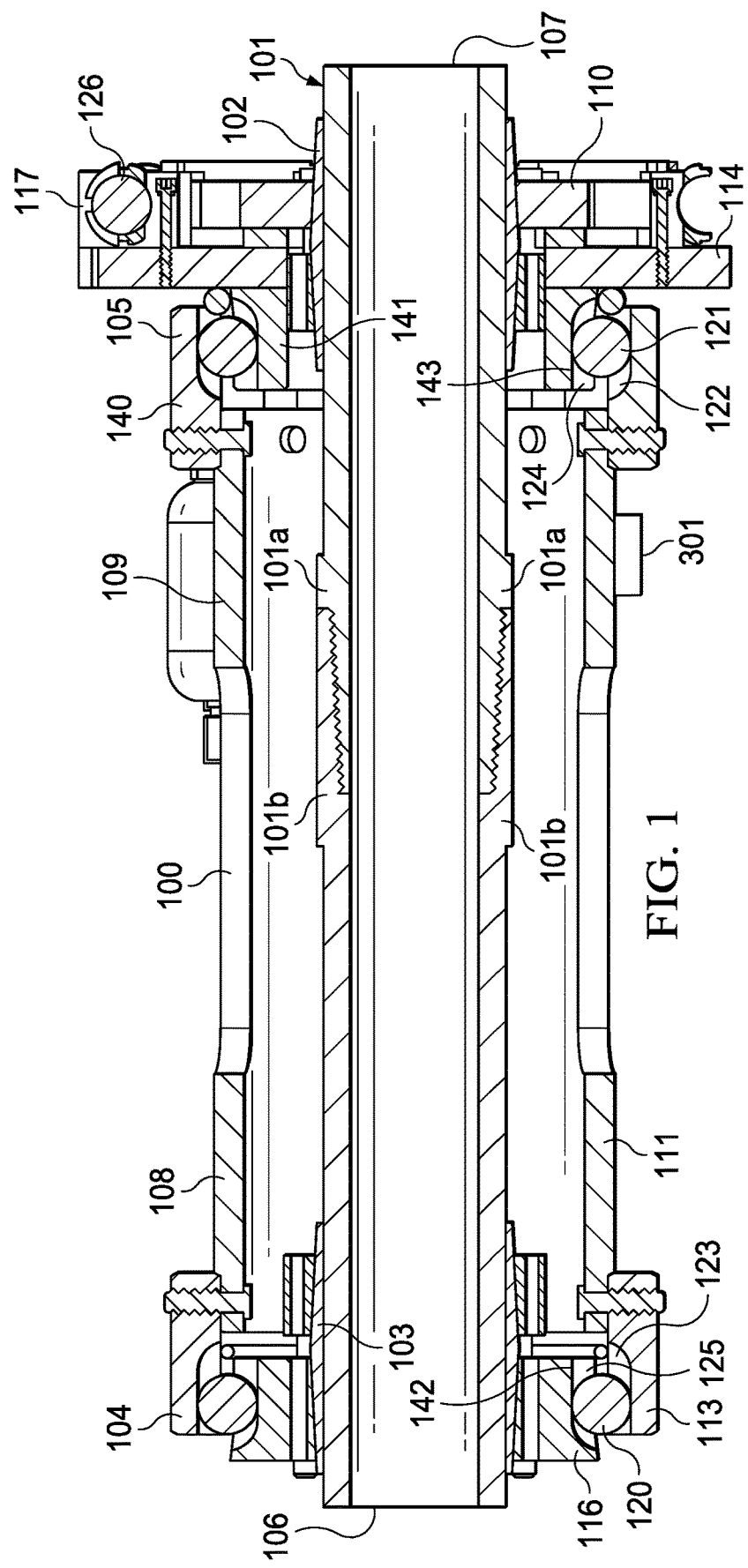
FIG. 1 shows an example embodiment cross section of a test assembly attached to a tubular test specimen.

An example embodiment is disclosed in FIG. 1 of a test assembly 100 for testing a specimen, in this case a tubular 101. The test assembly 100 includes a tubular shaped transfer tube 111 with a first end 108 and a second end 109. A first end assembly 104 is coupled to the transfer tube 111. The first end assembly 104 includes a cylindrically shaped first end cover 113 with a plurality of inwardly facing recessed axially oriented cylindrical half grooves 123. The first end assembly 104 further includes a cylindrically shaped first end keeper 116, disposed within the first end cover 113, and having a plurality of outwardly facing recessed axially oriented cylindrical half grooves 125. The first end keeper 116 is coupled to a wedge ring 103 that provides a clamping force from the first end assembly 104 and the first end 106 of the tubular 101. The clamping force is radial to the tubular and is achieved via axially oriented bolts that when tightened drive the first end keeper 116 inner taper onto the wedge ring 103 outer taper causing a clamping force that is sufficient to transmit the applied torque from 117 through the tubular from the first end 108 to the second end 109. This clamping mechanism may also be achieved via radially or transversely oriented clamping bolts. A spherical ball bearing 120 is located within each of the half grooves 123 and half grooves 125, which combine to form a cylindrical cavity 142, thus creating a plurality of spheres within a plurality of cylindrical cavities, where the sphere can move during axial (or in plane rotational) movement of the first end keeper 116 relative to the first end cover 113. The ball bearings 120 can transmit a torque about the axis of the tubular 101, while still allowing for the first end cover 113 to slide or rotate axially with respect to the dead keeper 116.

The second end assembly 105 is coupled to the second end 109 of the transfer tube 111 and the second end 107 of the tubular 101. The second end assembly 105 includes a cylindrically shaped housing 140 with a plurality of inwardly facing recessed axially oriented cylindrical half grooves 122. The second end assembly 105 further includes a cylindrically shaped inner housing 141, partially disposed within the housing 140, and having a plurality of outwardly facing recessed axially oriented cylindrical half grooves 124. A spherical ball bearing 121 is located within each of the half grooves 122 and half grooves 124, which combine to form a cylindrical cavity 143, thus creating a plurality of spheres within a plurality of cylindrical cavities. The ball bearings 121 can transmit a torque from the transfer tube 111 relative to the tubular 101 and about the axis of the tubular 101, while still allowing for the housing 140 to slide axially or rotationally with respect to the inner housing 141. The principal of this mechanism on the second end is the same as the first end.

The inner housing 141 is coupled to plate 114, which is part of a torque generating feature 117. The plate 114 is coupled to the torque plate 110 via actuators 126. The torque plate is fixed to the wedge ring 102, which is coupled to the second end 107 of tubular 101. The clamping force is radial to the tubular and is achieved via axially oriented bolts that when tightened drive the torque plate 114 inner taper onto the wedge ring 102 outer taper causing a clamping force that is sufficient to transmit the applied torque from 117 through the tubular from the first end 108 to the second end 109. This clamping mechanism may also be achieved via radially or transversely oriented clamping bolts. The actuators 126, in this example embodiment hydraulic actuators, apply a force between the plate 114 and the torque plate 110, in a circular pattern, to create a torque between tubular 101 and transfer tube 111. The torque applied to the tubular 101 at the first end assembly 104 is equal and opposite of the torque applied by the second end assembly 105.

In this example the tubular 101 is actually two pieces of pipe, a first pipe 101a and a second pipe 101b, coupled together with a threaded connection. Examples of threaded connections may include threaded tubular joints without shoulders, standard API drill-pipe tool joint, a conventional double shoulder drill-pipe tool joint, or a high torque double shoulder drill-pipe tool joint.

The test assembly 100 provides the ability to test a sample specimen, such as a tubular, a pipe coupling (for example a box-by-pin configuration common in the oilfield), or other types of threaded connections, by applying a torque to the sample specimen without interfering with the other applied testing loads, such as bending, pressure, compression, or motions such as rotation. For example, two drill pipe segments could be coupled together, pressurized internally to simulate operational conditions downhole, torqued to simulate the torque being applied to a drill string, a bending moment may be induced to simulate the curvature of the drill sting, a tension may be added to simulate the weight of the drill string being suspended in a wellbore, and then the drill pipe segments could be rotated to simulate the rotating of a drill string, all simultaneously without interfering with each other. This provides a comprehensive testing of the various forces acting on a drill string joint simultaneously during operation. The arrangement of the torque application mechanism is fairly liberal and is not to be construed as limited to the disclosures herein. For instance, the torque application could be enacted by splitting the transfer tube 111 into two parts that are rotatably independent of each other and with the appropriate mechanical arrangement and alignment to have a torque generated between the first half of transfer tube 111 and the second half of transfer tube 111. Other manifestations of the end bearing assemblies that provide the appropriate degree of freedom at each end of the test specimen may include a roller bearing in a square groove. It may include a Rzeppa joint or other forms of a constant velocity joint.

A sensor package 301 may be attached to the outside of the transfer tube 111. The sensor package 301 may include sensors for detecting bending, torsion, accelerometers, a battery pack, battery voltage, temperature sensors, and strain gauges. The sensor package 301 may include a battery, a data recording device, and a wireless transmitter/receiver for sending telemetry data while in operation. The sensor package 301 in this example rotates with the transfer tube 111 and sends real-time telemetry data to a nearby data acquisition and control unit.

Figure 2:
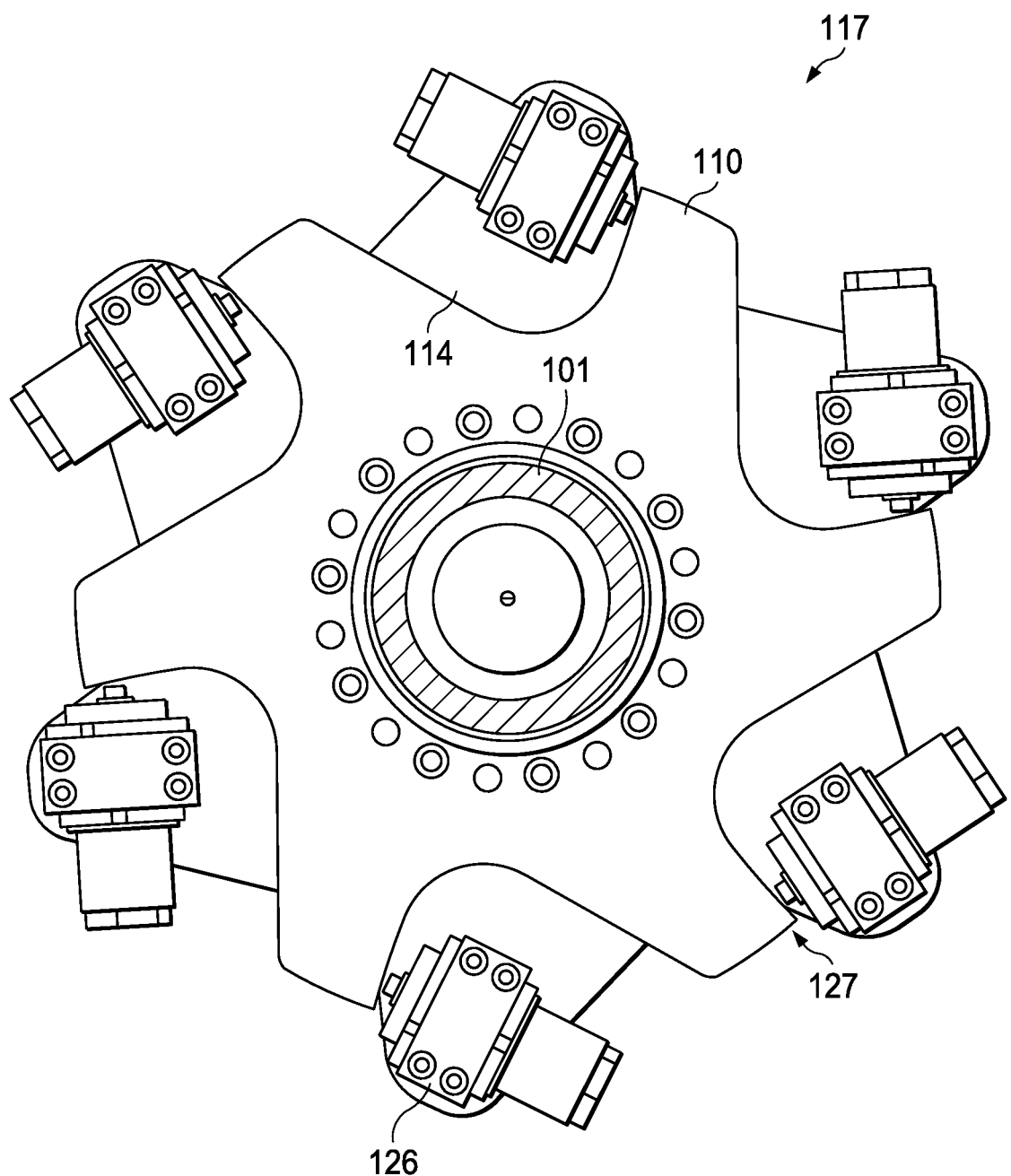
FIG. 2 shows a side view of the example embodiment torque generating configuration using a fixed star shaped plate and a rotatable star shaped plate.
Figure 3A:
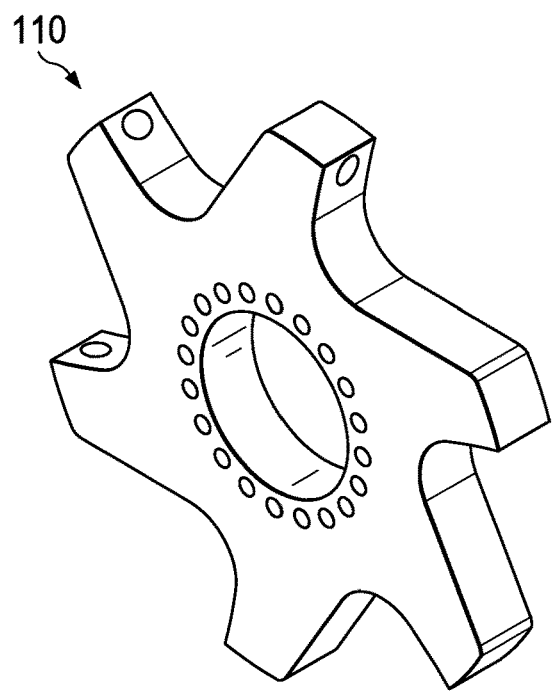
FIG. 3A shows the rotatable star shaped plate.
Figure 3B:
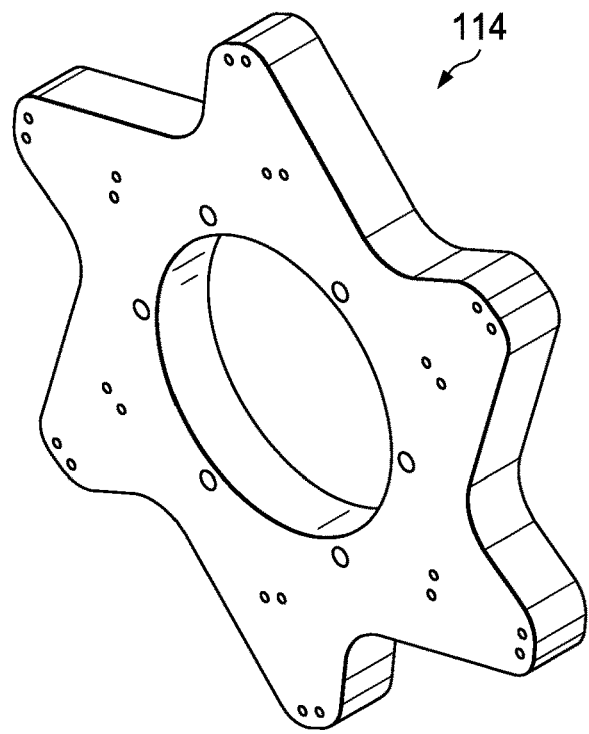
FIG. 3B shows the fixed or static plate.

A head on view of the torque generating feature 117 is shown in FIG. 2. The torque plate 110, also shown in FIG. 3A, is a star or gear shaped plate that is coupled to the end of tubular 101. The actuators 126 act on the edges 127 of plate 110. The actuators 126 are coupled to the plate 114, also shown in FIG. 3B, which is fixed to the transfer tube 111 via the second end assembly 105 (as shown in FIG. 1). The circular application of forces a set distance from the center axis results in generating a torque in tubular 101 relative to the transfer tube 111. The actuators 126 could be a threaded bolt, where the bolt is threaded is generated a set force on each of the edges 127 of plate 110.

FIGS. 4A, 4B, and 4C show different views of the components used in the first end assembly 104 and the second end assembly 105. FIG. 4A shows a cylindrically shaped inner housing 141 that has outwardly facing recessed axially oriented cylindrical half grooves 124. FIG. 4B shows first cylindrical body 116 with its outwardly facing recessed axially oriented cylindrical half grooves 125. FIG. 4C shows dead keeper 113 with its inwardly facing recessed axially oriented cylindrical half grooves 123.

FIG. 5A shows a side view and FIG. 5B shows a top view of an example test stand 200. The entire torque assembly 100 can be installed into other test stands (such as a load frame) to achieve various desired test load applications. The test includes a test frame 140. The sample 150 is located on fixed rollers 132 and 133 and sleeves 130 and 131 are used at where the rollers and tubular interact. Tension cables 135 and 134 are coupled to the end of sample 150 via tubular coupling 136 and 137, respectively, and provide an axial force on sample 150 when tightened. Torque is provided to a specific location on the tubular by the test assembly 100 which includes the first assembly 104, the transfer tube 111, the second assembly 105, and the torque generating feature 117. Actuators 138 and 139 provide a pushing or pulling force on either end of the sample 150 to generate sending moments within sample 150. Sample 150 can be rotated, while torqued and under an axial load. The sample 150 in this example may be shown as a single cylindrical specimen, however it could be a jointed or coupled pipe, where the joint or coupling is located either within the test assembly 100 or outside the assembly 100, depending on the desired test. The torque, bending, and rotating simulates how piping undergoes bending within a borehole for an oilfield application such as drilling. A sensor package 301 is attached to torque tube 111. It is capable of operating while torque tube 111 is rotating. The sensor package 301 includes a plurality of sensors, it can record data, and it can transmit telemetry in real-time to a nearby data acquisition and control unit.

Figure 6:
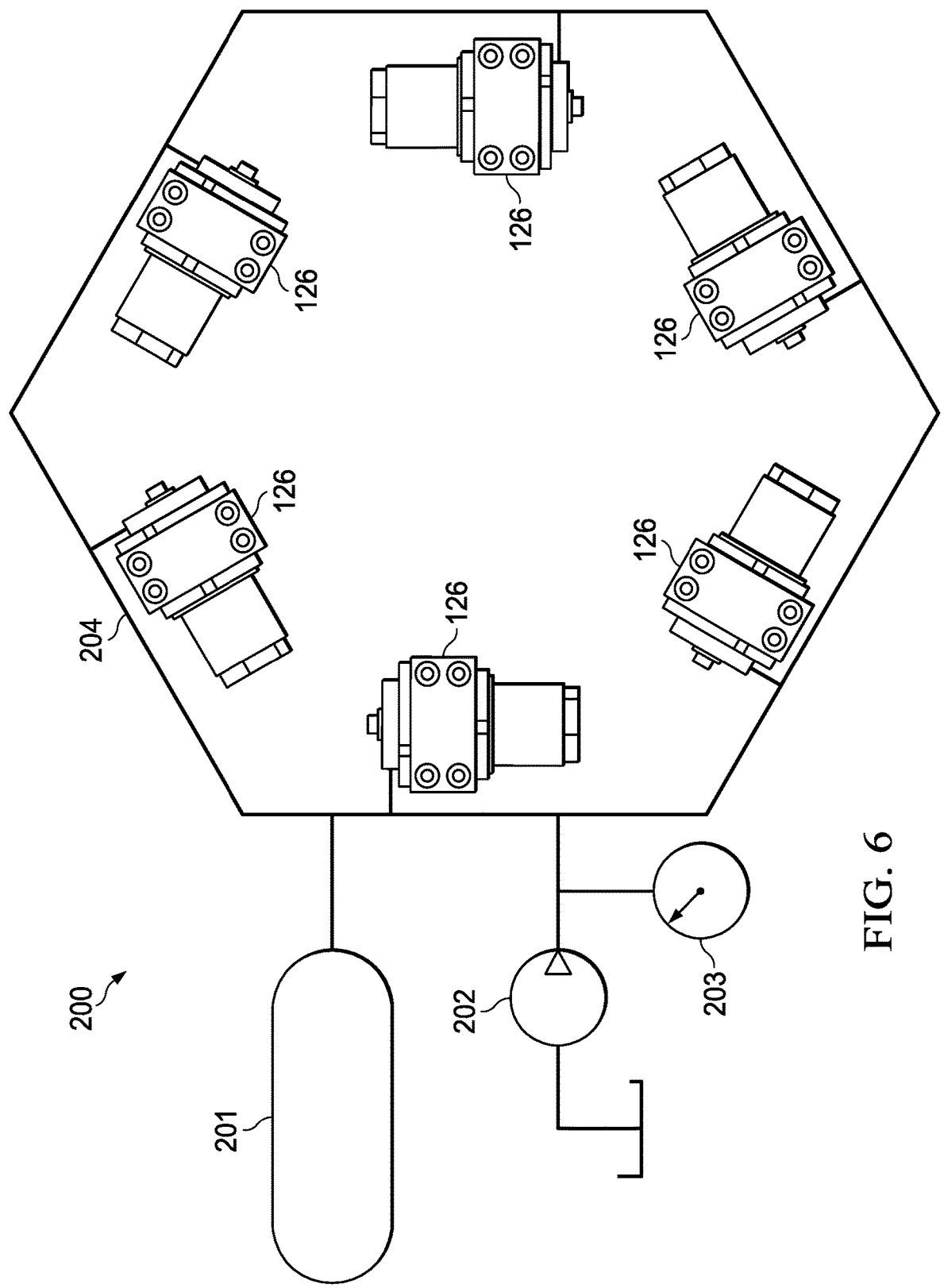
FIG. 6 shows an example flow loop for providing hydraulic pressure to the actuators used to apply a torque to a test specimen.

FIG. 6 shows an example hydraulic circuit 200 used to apply torque to a test specimen via actuators 126. Flowline 204 distributes hydraulic fluid to each of the actuators 126. The pressure is supplied from a pump 202. An accumulator 201 provides a reservoir of fluid to dampen pulsations from the pump 202 as well as allow finer control of the pressure applied to the actuators. Pressure data may be gathered by a gauge 203, or one or more pressure sensors at various locations on the flowline 204. The accumulators 201 allow for pressure damping as well as relative motion between the two start plates while maintaining constant torque. The actuators 126 may be actively pressurized, where a pump controls the pressure while the test specimen is rotated. Active pressurization allows for holding constant torque or purposefully fluctuating the applied torque throughout the testing. Another option is passive pressurization, where the actuators 126 are pressurized and then disconnected from the pump during testing.

Once the test specimen is set up and positioned in the test assembly, the gas pre-charged accumulator 201 and hydraulic circuit 200 is pressurized with a pump 202 to the desired pressure to apply the desired torque level for the test. Then the pump 202 is disconnected before rotating the test specimen. This allows the device to freely rotate without being tethered to a pump. The accumulator 201 may be mounted on-board so that it rotates with the test specimen and is able to continue to hold pressure in the hydraulic circuit 200. The accumulator 201 maintains pressure, and thus torque, on the sample and small relative rotational motion occurs between the two ends of the test specimen. The accumulator allows a threaded connection in the test sample to continue to screw together while subjected to rotation, bending, and torque. This may continue until the cylinders are completely stroked out and then the test may be stopped, the two ends screwed together forming a test specimen may be re-indexed, the cylinders re-pressured, and then the rotational bending testing may continue. Another embodiment of the hydraulics may include a hydraulic swivel mounted on the end of the test sample assembly that will allow a full time hydraulic connection and continuous control while rotating the test specimen.

Figure 7:
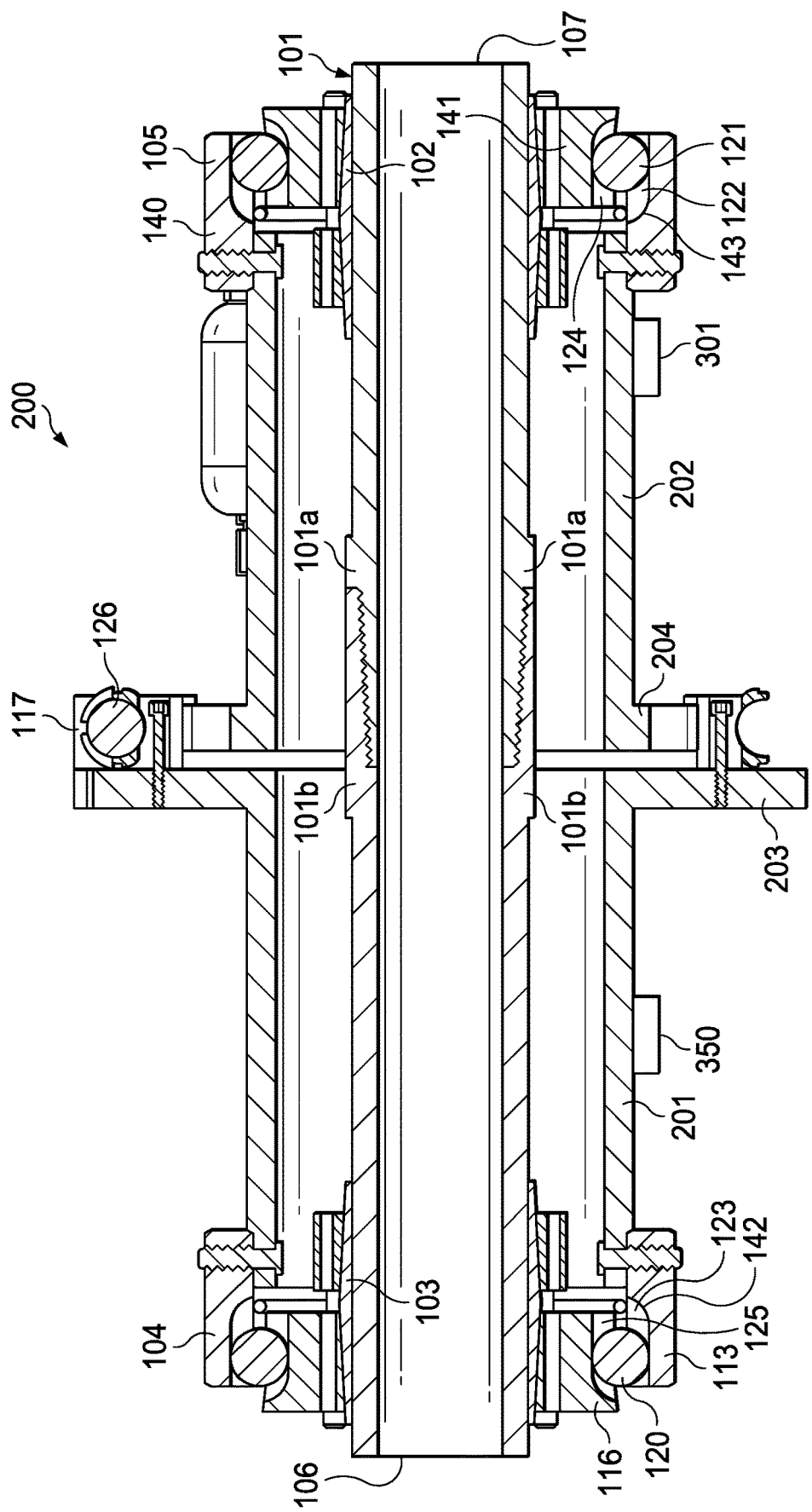
FIG. 7 shows an example embodiment cross section of a test assembly attached to a tubular test specimen.

An example embodiment is disclosed in FIG. 7 of a test assembly 200 for testing a specimen, in this case a tubular 101. This example embodiment test assembly 200 includes a first tubular shaped transfer tube 201 and a second tubular transfer tube 202. A first end assembly 104 is coupled to the first transfer tube 201. The first end assembly 104 includes a cylindrically shaped first end cover 113 with a plurality of inwardly facing recessed axially oriented cylindrical half grooves 123. The first end assembly 104 further includes a cylindrically shaped first end keeper 116, disposed within the first end cover 113, and having a plurality of outwardly facing recessed axially oriented cylindrical half grooves 125. The first end keeper 116 is coupled to a wedge ring 103 that provides a clamping force from the first end assembly 104 and the first end 106 of the tubular 101. The clamping force is radial to the tubular and is achieved via axially oriented bolts that when tightened drive the first end keeper 116 inner taper onto the wedge ring 103 outer taper causing a clamping force that is sufficient to transmit the applied torque from the radial displacement of first transfer tube 201 with the second transfer tube 202. This clamping mechanism may also be achieved via radially or transversely oriented clamping bolts. A spherical ball bearing 120 is located within each of the half grooves 123 and half grooves 125, which combine to form a cylindrical cavity 142, thus creating a plurality of spheres within a plurality of cylindrical cavities, where the sphere can move during axial (or in plane rotational) movement of the first end keeper 116 relative to the first end cover 113. The ball bearings 120 can transmit a torque about the axis of the tubular 101, while still allowing for the first end cover 113 to slide or rotate axially with respect to the dead keeper 116.

The second end assembly 105 is coupled to the second transfer tube 202 and the second end 107 of the tubular 101. The second end assembly 105 includes a cylindrically shaped housing 140 with a plurality of inwardly facing recessed axially oriented cylindrical half grooves 122. The second end assembly 105 further includes a cylindrically shaped inner housing 141, disposed within the housing 140, and having a plurality of outwardly facing recessed axially oriented cylindrical half grooves 124. A spherical ball bearing 121 is located within each of the half grooves 122 and half grooves 124, which combine to form a cylindrical cavity 143, thus creating a plurality of spheres within a plurality of cylindrical cavities, where the ball bearings 121 can transmit a torque from the second transfer tube 201 to the second end 107 of tubular 101 about the axis of the tubular 101, while still allowing for the housing 140 to slide axially or rotationally with respect to the inner housing 141. The principal of this mechanism on the second end assembly 105 is the same as the first end assembly 104.

Still referring to FIG. 7, in this example embodiment the torque generating feature 117 couples first transfer tube 201 and second transfer tube 202. The torque is generated via actuators 126 creating a radial displacement between first transfer tube 201 and second transfer tube 202. The second end assembly 105 includes wedge ring 102, which is coupled to the second end 107 of tubular 101. The clamping force is radial to the tubular and is achieved via axially oriented bolts that when tightened drive the torque plate 114 inner taper onto the wedge ring 102 outer taper causing a clamping force that is sufficient to transmit the applied torque from 117 through the tubular from the first end 108 to the second end 109. This clamping mechanism may also be achieved via radially or transversely oriented clamping bolts. The actuators 126, in this example embodiment hydraulic actuators, apply a force between the flange 203 attached to the first transfer tube 201 and flange 204 attached to the second transfer tube 202, in a circular pattern, to create a torque between the first end 106 and the second end 107 of tubular 101. The torque applied to the tubular 101 at the first end assembly 104 is equal and opposite of the torque applied by the second end assembly 105.

In this example the tubular 101 is actually two pieces of pipe, a first pipe 101a and a second pipe 101b, coupled together with a threaded connection. The tubular 101 could be a single tubular, a pipe, it may have one or more joints or connections.

The sensor package 301 includes a plurality of sensors attached to second transfer tube 202, it may record data, and it may transmit telemetry in real-time to a nearby data acquisition and control unit. The sensor package 350 includes a plurality of sensors attached to first transfer tube 201, it may record data, and it may transmit telemetry in real-time to a nearby data acquisition and control unit. A spherical ball bearing 120 is located within each of the half grooves 123 and half grooves 125, which combine to form a cylindrical cavity 142, thus creating a plurality of spheres within a plurality of cylindrical cavities, where the sphere can move during axial (or in plane rotational) movement of the first end keeper 116 relative to the first end cover 113.

Figure 8A:
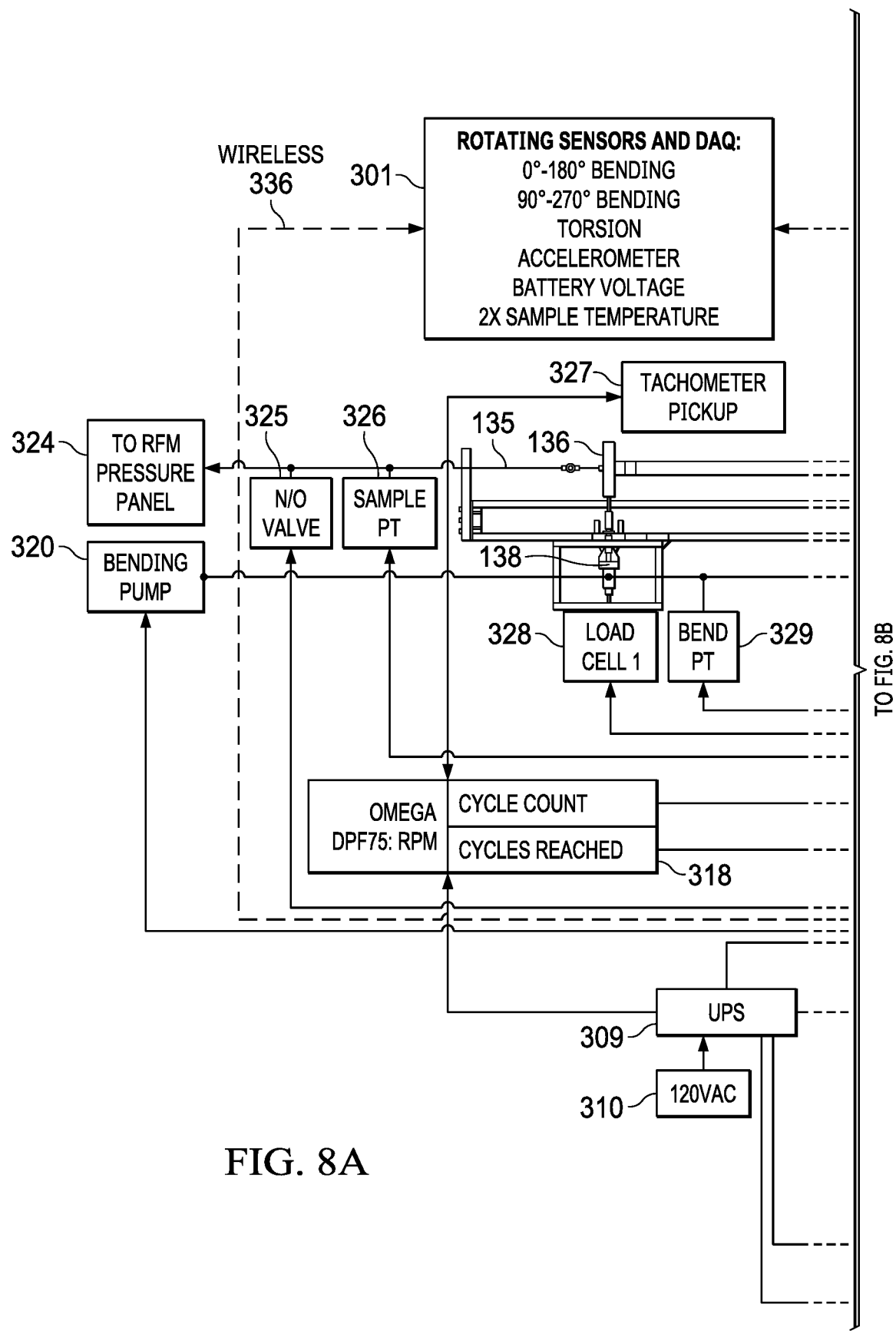
FIG. 8A shows a block diagram of a test system with controllers, sensors, and auxiliary systems.
Figure 8B:
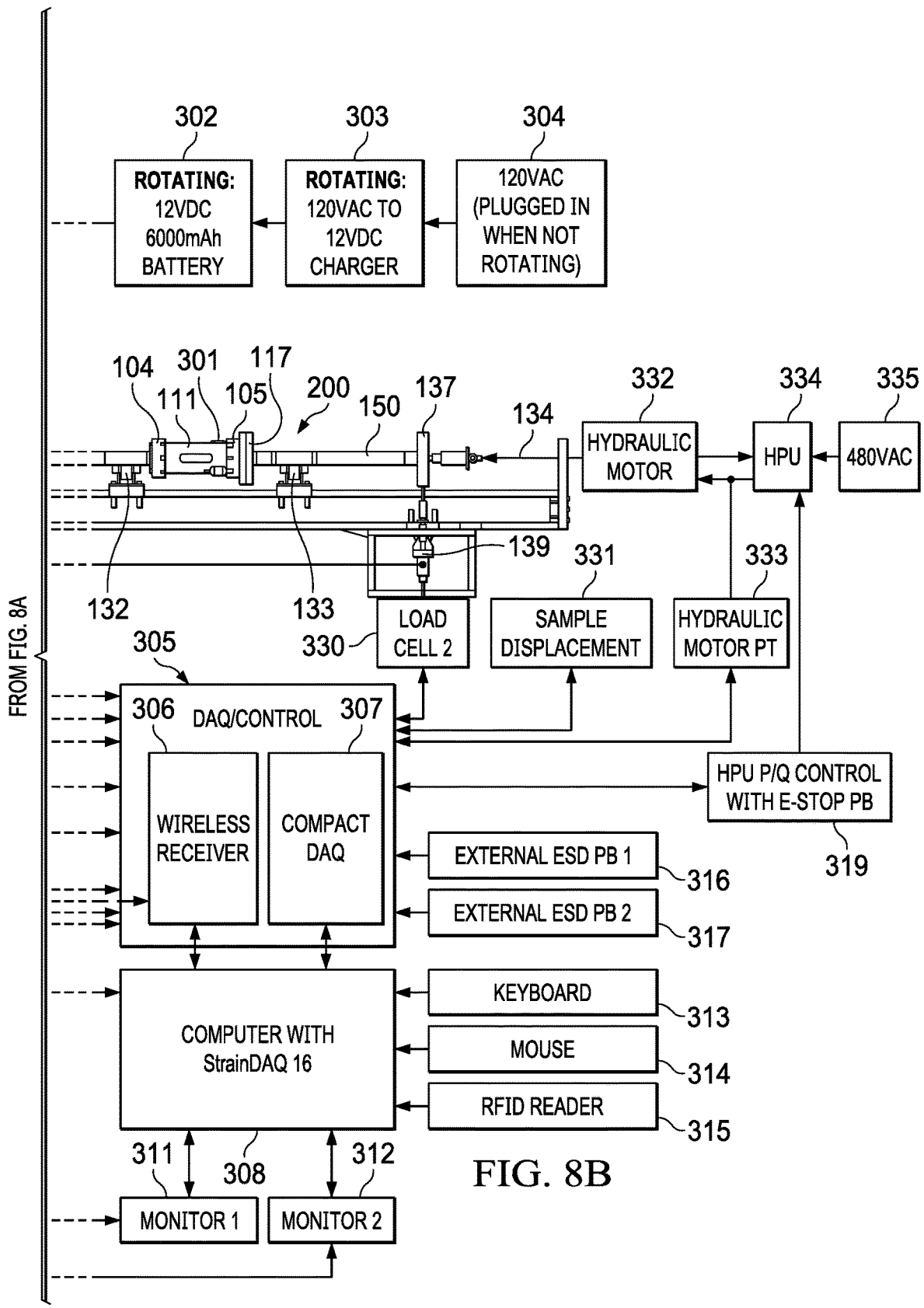
FIG. 8B shows a block diagram of a test system with controllers, sensors, and auxiliary systems.

An example block diagram of a test setup of test stand 200 is depicted in FIGS. 8A and 8B. The sample 150 is located on fixed rollers 132 and 133. Tension cables 135 and 134 are coupled to the end of sample 150 via tubular coupling 136 and 137, respectively, and provide an axial force on sample 150 when tightened. Torque is provided to a specific location on the sample 150 by the test assembly which includes the first assembly 104, the transfer tube 111, the second assembly 105, and the torque generating feature 117. Actuators 138 and 139 provide a pushing or pulling force on either end of the sample 150 to generate moment forces within sample 150. Sample 150 can be rotated, while torqued, and under an axial load. The sample 150 in this example may be a single cylindrical specimen, however it could be a jointed or coupled pipe, where the joint or coupling is located either within the test assembly or outside the assembly, depending on the desired test. A sensor package 301 is attached to torque tube 111. It is capable of operating while torque tube 111 is rotating. The sensor package 301 includes a plurality of sensors, it can record data, and it can transmit telemetry in real-time to a nearby data acquisition and control unit.

Sensor package 301 in this example contains sensors for measuring bending from 0-180 degrees, bending from 90-270 degrees, torsion, accelerations in one or more directions, battery voltage, and multiple temperature measurements. The sensor package 301 is powered by a 12 VDC 6000 mAh battery 302 when rotating. It also contains a 120 VAC to 12 VDC charger 303. When the transfer tube 111 is not rotating the sensor package 301 may be powered externally by 120 VAC 304. The sensor package 301 is wirelessly 336 linked to a digital acquisition and control unit, DAQ 305. The DAQ 305 includes a wireless receiver 306 and a compact DAQ 307. The information acquired by the DAQ 305 is shared with and controlled by a computer 308.

Load cells 328 and 330 (load cell 1 and 2) measure the load at actuator 138 and 139, respectively, and send those measurements to DAQ 305. Bending pressure transducer 329 measures the pressure supplied to actuators 138 and 139 by bending pump 320, which is controlled by DAQ 305. A tachometer 318, such as an Omega DPF75, measures the speed and number of rotations of the sample 150 via tachometer pickup 327. The sample 150 can be pressurized internally by water pump 324, in this case a resonant fatigue machine pressure panel, and the pressure is controlled by valve 325 and measured by pressure transducer 326.

A hydraulic power unit 334, powered electrically 335, is used to supply hydraulic power to hydraulic motor 332 for turning sample 150. The hydraulic power unit 334 is controlled by controller 319. The supplied hydraulic power is measured by a pressure transducer 333. The movement of the sample 150 is further measured at various locations 331 in a one or more axis around the test stand 200 and the information is sent to the DAQ 305.

Power 310 is supplied to battery backup 309, which powers the system. In this example two computer monitors, 311 and 312, are used for testing. A mouse 314, keyboard 313, and RFID reader 315 are used. Two emergency shut down buttons, 316 and 317, may be used to shut down the system in case of an emergency.

Although the invention has been described in terms of embodiments which are set forth in detail, it should be understood that this is by illustration only and that the invention is not necessarily limited thereto. For example, terms such as axial forces could mean tensile forces, compressive forces, it could be a combination of the two. Furthermore, an axial force could be applied at the end of a test specimen or within the test specimen, such as inducing an axial force with pressure. Top and bottom could be left and right, respectively. Terms such as tubulars, torque transfer tubes, may be pipes, they may have a circular cross section, a rectangular cross section, or other configurations that are commonly used in tubulars. The alternative embodiments and operating techniques will become apparent to those of ordinary skill in the art in view of the present disclosure. Accordingly, modifications of the invention are contemplated which may be made without departing from the spirit of the claimed invention.

What is claimed is:

1. An apparatus for testing specimens comprising:
   a torque transfer tubular having center axis, a first end, and a second end;
   the first end of the torque transfer tubular having a clamp adapted to statically mount to a first location on a test specimen, wherein the clamp establishes a static contact between the torque transfer tubular first end and the test specimen;
   the second end of the torque transfer tubular having a first circumferential plate and a second circumferential plate located proximate to the first circumferential plate and having a clamp adapted to statically mount to a second location on a test specimen, wherein a torque is generated in the test specimen between the first location and second location by generating a rotating displacement between the first circumferential plate and second circumferential plate about the center axis of the torque transfer tubular.

2. The apparatus of claim 1, wherein the first circumferential plate is substantially star shaped.

3. The apparatus of claim 2, wherein the second circumferential plate is substantially star shaped.

4. The apparatus of claim 1, wherein the torque transfer tubular has a circular cross section.

5. The apparatus of claim 1, wherein the torque transfer tubular has a rectangular cross section.

6. The apparatus of claim 1, further comprising a plurality of actuators coupled between the first circumferential plate and the second circumferential plate, arrayed about the center axis, wherein the actuators generate an offsetting force between the two plates, resulting in a torque about the center axis.

7. The apparatus of claim 1, further comprising a torque generating means coupled between the first circumferential plate and the second circumferential plate, arrayed about the center axis.

8. The apparatus of claim 1, wherein the test specimen is rotated at a predetermined number of revolutions per minute while maintaining the torque differential between the first location and the second location.

9. The apparatus of claim 1, wherein the test specimen is pressurized to a predetermined internal pressure.

10. An apparatus for testing specimens comprising:
    a torque transfer tubular having center axis, a first portion having a distal end, and a second portion, wherein the first portion and the second portion are aligned coaxially along the center axis and located adjacent to each other;
    the first portion of the torque transfer tubular having a clamp adapted to statically mount to a first location on a test specimen and a first circumferential plate located on the distal end adjacent to the second portion of the torque transfer tubular, wherein the clamp establishes a static contact between the first portion of the torque transfer tubular and the test specimen;
    the second portion of the torque transfer tubular having a second circumferential plate located proximate to the first circumferential plate and having a clamp adapted to statically mount to a second location on a test specimen, wherein a torque is generated in the test specimen between the first location and second location by generating a rotating displacement between the first circumferential plate and second circumferential plate about the center axis of the torque transfer tubular.

11. The apparatus of claim 10, wherein the first circumferential plate is substantially star shaped.

12. The apparatus of claim 11, wherein the second circumferential plate is substantially star shaped.

13. The apparatus of claim 10, wherein the torque transfer tubular has a circular cross section.

14. The apparatus of claim 10, wherein the torque transfer tubular has a rectangular cross section.

15. The apparatus of claim 10, further comprising a plurality of actuators coupled between the first circumferential plate and the second circumferential plate, arrayed about the center axis, wherein the actuators generate an offsetting force between the two plates, resulting in a torque about the center axis.

16. The apparatus of claim 10, further comprising a torque generating means coupled between the first circumferential plate and the second circumferential plate, arrayed about the center axis.

17. The apparatus of claim 10, wherein the test specimen is rotated at a predetermined number of revolutions per minute while maintaining the torque differential between the first location and the second location.

18. The apparatus of claim 10, wherein the test specimen is pressurized to a predetermined internal pressure.

\* \* \* \* \*